United States Patent [19]

Miettunen

[11] Patent Number: 4,546,13?

[45] Date of Patent: Oct. 8, 198?

[54] METHOD FOR MAKING CONCRETE WEATHER-RESISTANT

[75] Inventor: Aulis O. Miettunen, Parainen, Finland

[73] Assignee: Oy Partek Ab, Parainen, Finland

[21] Appl. No.: 654,539

[22] PCT Filed: Dec. 9, 1981

[86] PCT No.: PCT/FI81/00089

§ 371 Date: Jul. 28, 1982

§ 102(e) Date: Jul. 28, 1982

[87] PCT Pub. No.: WO82/02196

PCT Pub. Date: Jul. 8, 1982

Related U.S. Application Data

[63] Continuation of Ser. No. 403,665, Jul. 28, 1982, abandoned.

[30] Foreign Application Priority Data

Dec. 22, 1980 [FI]   Finland .................................. 804005

[51] Int. Cl.[4] ............................................... C08K 3/00
[52] U.S. Cl. ............................................ 524/8; 524/2
[58] Field of Search ........................ 524/7, 8, 2, 914; 106/90

[56] References Cited

U.S. PATENT DOCUMENTS

| | | | |
|---|---|---|---|
| 1,940,528 | 12/1933 | Bond | 106/9 |
| 2,623,914 | 12/1952 | Bell et al. | 260/73 |
| 3,301,799 | 1/1967 | Rothberg et al. | 524/ |
| 4,157,998 | 6/1979 | Berntsson et al. | 524/ |

FOREIGN PATENT DOCUMENTS

| | | | |
|---|---|---|---|
| 0003469 | 8/1979 | European Pat. Off. | 524/? |
| 5243815 | 10/1975 | Japan | 524/? |
| 57-183356 | 11/1982 | Japan | 524/? |
| WO82/2196 | 7/1982 | PCT Int'l Appl. | 524/? |

OTHER PUBLICATIONS

Chemical Engineering; Characteristics of Fine Particles; Jun. 1962.

*Primary Examiner*—Lewis T. Jacobs

[57] ABSTRACT

The invention relates to a method of making concrete used in hydrotechnical structures weather-resistant as regards the freezing of water absorbed into the pores of the concrete. The problem in this connection consists of the expansion of freezing water and the consequent state of tension in the concrete. According to the invention, a small amount of micro-sized rubber powder is mixed with the concrete mix, the rubber particles forming even-surfaced, closed buffers into which the water expanding when it freezes can expand without producing states of tension in the concrete. The rubber particles are ground from the rubber parts of used automobile tires.

8 Claims, No Drawings

METHOD FOR MAKING CONCRETE WEATHER-RESISTANT

This application is a continuation of application Ser. No. 403,665, filed July 28, 1982, abandoned.

The present invention relates to a method of making concrete weather-resistant and particularly to a method in which allowance is made for water absorbed into the pores of concrete to expand when the water freezes.

In the concrete industry, the expansion of freezing water causes problems especially in hydrotechnical structures. Water which is absorbed into the pores of concrete and freezes there produces micro-cracks, which in the course of time reduce the strength of the concrete. Only recently has a realistic picture been obtained of this micro-process, but satisfactory methods for preventing damage have not been known so far.

In order to prevent damage caused by freezing water it is necessary to produce in the concrete, in one way or another, micro-pores which are not filled with water absorbed into the pores of concrete but which allow freezing water to expand into them. In other words, the pores must be made to serve as buffers.

According to one method so far used, air bubbles are formed in concrete. For this purpose, a surface-active agent is added to the concrete mix, and as a result the surface tension of the water decreases, whereby air bubbles are produced in the concrete.

This known method can be said to have the following disadvantages:

the pores are too large in proportion to the capillaries of concrete and decrease the strength of the concrete the entrained air does not remain homogeneously distributed, and the number of bubbles decreases during transport the additional air-entraining agent used for the formation of the bubbles is in part absorbed during the preparation and transporting stage of the concrete mix by the carbon of fly-ash, which is nowadays increasingly used as a cement addition. Thus it has proven to be very difficult to obtain the correct quantity of additional entrained air in concrete.

Attempts have been made to reduce the said disadvantage by developing appropriate micro air entraining agents. One such agent is, for example, commercially available Kleenopor SA-8, which consists of plastic blisters. The diameter of the plastic blisters corresponds to the dimensions of the capillaries in concrete, and thus overdimensioned voids will not be produced. This and similar micro air entraining agents have, however, the following disadvantages:

the agent is very expensive the plastic blisters are very lightweight, and special measures are required for mixing them with the concrete mix the surface of the plastic blisters is weak, and so in order to avoid breakage of the blisters, the mixing must be carried out in a precisely determined order the film of the plastic blisters does not tolerate temperatures above $+70°$ C., and therefore the blisters are not suitable for the increasingly common hot-concrete projects, in which the temperature of the concrete mix is $+80°$ C.

By the method according to the present invention it has been possible to eliminate the above-mentioned disadvantages.

In accordance with the invention, a suitable amount, determined through experiments, of a micro-sized rubber powder is mixed with the concrete mix; advantageously the powder has been ground from used automobile tires. The ground rubber may be natural rubber or synthetic rubber or, preferably, mixtures of the same. An advantageous mixture consists of 30% natural rubber and 70% synthetic rubber, for example in the form of styrene butadiene and polybutadiene.

Rubber powder is used precisely in the amount optimized according to need, the amount being between 0.2 and 2% by weight of the amount of cementing agent. The optimum particle size for the powder is between 10 and 250 $\mu$m.

The mixing of a rubber powder prepared from used rubber, especially used automobile tires, with concrete mixes is previously known, but not for the same purpose and not with the same results.

The object of Swiss Pat. No. CH-602,515 is to produce more lightweight concrete by mixing with the concrete mix as a filler 10–90% plastic and/or waste rubber with macroscopic dimensions. The main objective is to achieve sufficient adherence between the filler and the other components in order to maintain the strength of the concrete both during curing and in the final cured state.

The objective of German Pat. No. DE 1,011,803 is to produce lightweight grouting concrete, especially for bases and floors. The formed concrete should have improved thermal and sound insulation properties and it should have better than previous water repellance. This is achieved by mixing as a filler with the concrete mix, rubber of macroscopic dimensions. By means of mineral additive fibers the stresses are evened out so as to be three-dimensional.

The objective of British Pat. No. GB 1,362,614 is to provide a lightweight plaster or concrete with improved thermal and sound insulation properties. This is achieved by mixing with the mix as a filler, for example, rubber ground from used automobile tires, in a minimum amount of 50% and with a maximum particle size of 10 mm.

The objective of European Patent Publication No. 003469 is to compensate for the shrinkage of concrete mixes. This objective is achieved by mixing, with the concrete mix, rubber ground from used automobile tires, the maximum particle size of the ground rubber being 10 $\mu$m and its maximum amount 35% of the reinforcement fiber amount. The item of application thus also requires the use of reinforcement fibers, in which case the ratio of the amount of rubber to the amount of fiber is important.

However, none of these known methods deal with the problems due to freezing of the water absorbed in the pores of concrete or the solving of these problems, and only the method according to European Patent Publication No. 003469 uses micro-sized rubber powder, less than 10 $\mu$m, which is, however, smaller than in the present method, but in addition to rubber powder it uses reinforcement fibers and the object of the method is to compensate for the normal shrinkage of concrete.

The method according to the present invention is thus based on the idea of replacing the previously used entrained air and plastic blisters with micro-size rubber powder particles. According to need, a precisely optimized amount, 0.2–2% of the amount of cementing agent, of ground rubber, especially rubber powder prepared from used automobile tires, is mixed with the concrete mix. The rubber used is thus in general a mixture of natural and synthetic rubber and advantageously contains, for example, 30% natural rubber and 70% synthetic rubber, such as styrene butadiene and polybutadiene. By means of the rubber powder, spaces into which the pressure of water freezing in the concrete can be released are created in the concrete. When the ice melts, the compressed elastic rubber again forces the water out and is ready to compress again under pressure. The optimum particle size can be found within the range 10–250 μm. In cured concrete the rubber particles form even-surfaced, closed micro-pores. The even surface is important in order to prevent dislocations.

The effective closing is important in order for the pores to serve as buffers for the water which expands when it freezes.

The resistance of concrete to weather as regards freezing expansion is expressed in concrete technology by means of the so-called freezing expansion number. The freezing expansion expresses the change in length of a test specimen during the freezing stage as compared with the change in length calculated according to the temperature coefficient. The more negative this number is, the better the resistance of concrete to the stresses due to freezing water. When the number is positive, a state of tensile stress prevails in the concrete test specimen, i.e. a state of tension in which concrete is susceptible to cracking.

In all test specimens prepared according to the invention and checked, the freezing expansion number was negative, and a couple of examples of this are given below:

EXAMPLE 1

Amount of rubber powder: 0.5% by weight of the cementing agent
Particle size: approx. 100 μm
Freezing expansion: −27 μm/m

EXAMPLE 2

Amount of rubber powder: 1.5% by weight of the cementing agent
Particle size: 80–200 μm
Freezing expansion: −42 μm/m The substantial advantages of the method according to the invention are as follows:

A concrete mix with a rubber powder admixture naturally withstands the temperature, 80° C., required by hot concrete. The method is easy to carry out, since ground rubber flows readily and does not form into lumps and can therefore be batched directly into the concrete mix. The preparation of the rubber powder is also simple. The rubber part of discarded automobile tires is peeled off by a known method and is ground to a suitable diameter size. The grinding can, when necessary, be carried out at a low temperature in order to minimize the grinding energy requirement. One of the greatest advantages of the method according to the invention is thus its simplicity and above all its low price, which is substantially affected by the fact that the raw material used is waste material.

I claim:

1. A weather-resistant, high-strength concrete for structures subject to water that freezes to ice and melts again depending on ambient temperature, comprising: a concrete mix, including a cementing agent and rubber powder mixed in the concrete mix, the particle size of said rubber powder being between 80 and 250 μm and the amount thereof being 0.2–2% by weight of the cementing agent, whereby water absorbed into pores of the concrete may expand upon freezing into space occupied by the rubber powder particles and compress the same.

2. The concrete according to claim 1, wherein said rubber powder consists of ground used automobile tires.

3. The concrete according to claim 1 or 2, wherein said rubber powder is natural rubber.

4. The concrete according to claim 1 or 2, wherein said rubber powder is synthetic rubber.

5. The concrete according to claim 1 or 2, wherein said rubber power is a mixture of natural and synthetic rubber.

6. The concrete according to claim 5, wherein said rubber powder is a mixture of 30% natural rubber and of 70% synthetic rubber.

7. The concrete according to claim 6, wherein said synthetic rubber is styrene butadiene.

8. The concrete according to claim 6, wherein said synthetic rubber is polybutadiene.

* * * * *